United States Patent [19]

Young

[11] 4,092,019
[45] May 30, 1978

[54] CABLE SPLICING BACKDROP AND HOLDER

[76] Inventor: Donald Leroy Young, 2805 Hill Valley Dr., Escondido, Calif. 92025

[21] Appl. No.: 778,360

[22] Filed: Mar. 17, 1977

[51] Int. Cl.² .............................................. H01R 43/00
[52] U.S. Cl. .............................. 269/296; 269/321 WE
[58] Field of Search ................. 269/43, 296, 321 WE; 29/760; 140/92.1

[56] References Cited

U.S. PATENT DOCUMENTS

| | | | |
|---|---|---|---|
| 3,665,574 | 5/1972 | Brown et al. | 29/760 X |
| 3,946,768 | 3/1976 | Fiorentino | 29/760 X |
| 3,956,822 | 5/1976 | Folk | 29/760 X |

Primary Examiner—Robert C. Watson
Attorney, Agent, or Firm—Brown & Martin

[57] ABSTRACT

A cable splicing backdrop and holder includes a generally rectangular backing panel to which is attached a pair of pockets at either side defining loops for receiving the ends of portions of separate cables and pockets for receiving the ends of the cables. The pockets are mounted with quick detaching means for adjusting the position of the pockets along the sides of the panel. The background is constructed of a light material on the face thereof to facilitate seeing the leads of the cable for splicing.

10 Claims, 2 Drawing Figures

CABLE SPLICING BACKDROP AND HOLDER

BACKGROUND OF THE INVENTION

Many power and communication cables are strung underground. These cables usually contain from several hundred up to several thousand leads or conductors and are frequently 4 to 6 inches in diameter. Due to the size and weight of these cables, they must be spliced at intervals of from 200 to 300 yards. Such splicing usually takes place in tunnels underground.

The conditions that exist in such tunnels are not ideal in that they are not well lighted and moisture usually exists in the form of condensation on the concrete walls of the tunnels. Because of moisture, low voltage (12 volts), low wattage (25 watts) lights are used in the tunnels. Dim light inhibits the splicing operation and can lead to errors.

Moisture in the tunnel area when splicing is taking place can cause a problem by getting into the cable and shorting or otherwise damaging the cable.

The ends of two cables to be spliced are typically supported on a portable metal rack in the tunnel with some leads extending into the splicing area and other leads bent back out of the way. Sometimes the cables are supported by a worker himself over his shoulders while the leads are being selectively spliced. The leads frequently come into contact with and picks up moisture from the rack or tunnel walls.

It is therefore desirable that some means be available for supporting the ends of cables to be spliced, for preventing the accumulation of moisture in the cables and for facilitating the splicing of such cables.

SUMMARY AND OBJECTS OF THE INVENTION

It is the primary object of the present invention to overcome the above problems of the prior art.

Another object of the present invention is to provide a cable splicing backdrop for holding the ends of cables during the splicing operation.

A further object of the present invention is to provide a cable splicing backdrop which improves visibility for splicing operations and includes adjustable holding means for holding ends of cables in position for the splicing operation.

In accordance with the primary aspect of the present invention a cable splicing backdrop includes a generally rectangular backing panel of a light colored material having adjustable holding means attached to the sides thereof with adjustable means for adjusting the heights for holding means for holding the ends of cables during the splicing operation.

BRIEF DESCRIPTION OF THE DRAWING

The above and other obects and advantages of the present invention will become apparent from the following description when read in conjunction with the drawings, wherein.

DETAILED DESCRIPTION OF A PREFERRED EMBODIMENT

Figure 1:
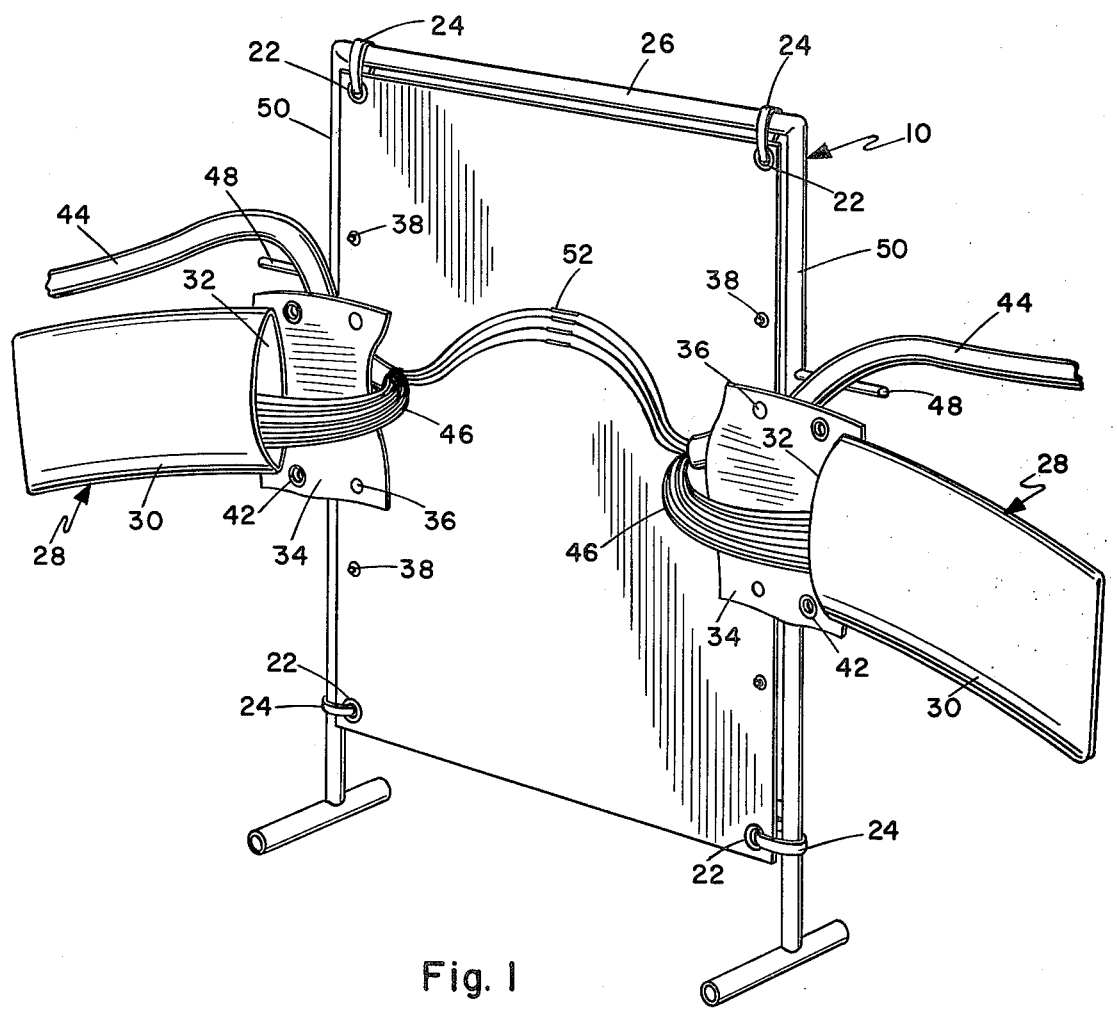
FIG. 1 is a perspective view of the backdrop in operation.
Figure 2:
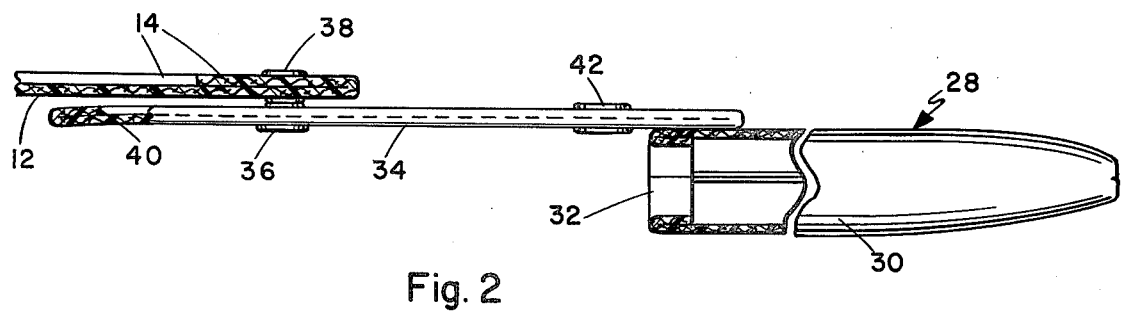
FIG. 2 is an enlarged top plan view, partially cut away, of the pocket attachment to the back panel.

Turning now to the drawing, there is illustrated a backdrop holding device in accordance with the present invention generally designated by the numeral 10, for holding a back panel 12 of a generally rectangular configuration having a height greater than the width with a top and bottom and two side edges of a generally identical configuration such that the panel is generally symmetrical about either axis. The panel is constructed of a suitable durable material such as a plastic lined woowen fabric. The plastic coating on the face of the panel is preferably very light color such as a shade of white to facilitate and enhance vision during this splicing operation.

In the preferred construction the panel 12 is constructed with overlapping edges 14 which are folded over and sewn and otherwise secured to the panel for reinforcing of all of the sides. The panel is further provided with suitable fastening means such as grommets 22 at the four corners thereof for securing the panels to the support frame 10 by means of straps or the like 24 as illustrated. These straps or tie cords 24 extend over a suitable support arm or bar 26 of the frame in a tunnel or man hole where splicing is to take place.

The backdrop includes adjustable holding means in the form of a pair of pockets secured in adjustable fashion to each side of the panel. These pockets generally designated by the numeral 28 include a pocket or bag portion 30 of a generally tubular or rectangular configuration having a open end 32 therein and closed on the opposite end. A flap or panel 34 is secured to the open end 32 of the pocket and extends outward therefrom. The panel 34 includes fastening means such as a pair of snaps 36 at the upper and lower edges thereof respectively which engage and snap to corresponding cooperative snap fastener elements 38 on the sides of the back panel 12. A plurality of the corresponding snap or fastening elements 38 are provided on each side of the panel 12 such that the pockets 30 may be secured thereto and be adjustable in height along the back panel.

The panel 34 includes reinforcing edging 40 at the upper and lower edges thereof in the form of a flap turned over and sewn or otherwise secured to the panel. The panel further includes additional fastening means such as grommets 42 through which tie cords or straps may be extended for tying the pocket to portion of a support frame or the like. In use of the device of the present invention a splicer mounts the back panel to the frame in a tunnel or manhole in position where a pair of cables come together for splicing. The backdrop is mounted a suitable height for the operator or splicer to work comfortably. Thereafter the pockets 28 are mounted in a suitable position to the back panel a suitable height to be comfortable for the splicer. The splicer then extends a cable 44 between each of the panels 34 and back panel 12 behind each of the pockets and inserts the leads or conductors 46 from each of the ends of the cables into the respective pockets 30. For additional support of the heavy cables the frame 10 has support arms 48 extending from the uprights 50 on opposite sides. The ends of the cables are then in a position facing each other at a suitable height for the splicer to then grasp corresponding coded conductors from each of the respective cables and splice them, as indicated at 52. The light colored backdrop of panel 12 provides a light background against which viewing the leads or conductors for splicing purposes is enhanced. This arrangement holds the ends of the cables into a position so that they may be easily manipulated for splicing purposes and at the same time holds them away from wet walls, wet metal support structure, and the like. Thus the splicing of cables is greatly enhanced by use of the device.

While the present invention has been illustrated and described by means of specific embodiments, it is to be understood that numerous changes and modifications may be made in the illustrated apparatus without departing from the spirit and scope of the invention as defined in the appended claims.

Having described my invention, I now claim:

1. A cable splicing backdrop and holder comprising:
a large generally rectangular backing panel of flexible material having a top end and a bottom end and fastening means adjacent the top side edges for attaching said panel to supporting structure,
loop means at each side of said panel for receiving and supporting the ends of opposed cables to be spliced, and
first and second pocket means for receiving the ends of said cables.

2. The cable backdrop and holder of claim 1, wherein means for adjusting the height of said loop means are along the sides of said backpanel.

3. The cable backdrop and holder of claim 1, wherein said pocket means include detachable fastening means for detachably fastening said pockets at selected heights along the sides of said panel.

4. The cable backdrop and holder of claim 1, wherein the face of said back panel is light in color.

5. The cable splicing backdrop of claim 1, wherein said loop means are defined by a portion of said pocket means, and said loop means and said pocket means are jointly adjustable in height along the edges of said back panel.

6. The cable splicing backdrop of claim 1, wherein said fastening means comprises a grommet for receiving a tie strap.

7. A cable splicing backdrop and holder comprising in combination:
a large generally rectangular backing panel of flexible material having a top end and a bottom end and fastening means adjacent the top side edges for attaching said panel to supporting structure,
loop means at each side of said panel for receiving and supporting the ends of opposed cables to be spliced,
first and second pocket means for receiving the ends of said cables,
a support frame having a base,
frame means extending upward from said base for supporting said backdrop, and
a pair of arms extending outward from said frame means for supporting said cables.

8. The cable backdrop and holder of claim 7, wherein the face of said back panel is light in color.

9. The cable splicing backdrop of claim 8, wherein said loop means are defined by a portion of said pocket means, and said loop means and said pocket means include detachable fastening means for securing to said back panel, and are jointly adjustable in height along the edges of said back panel.

10. The cable splicing backdrop of claim 9, wherein said fastening means comprises a grommet for receiving a tie strap.

* * * * *